March 12, 1946. G. L. REENSTIERNA 2,396,388
CAP CLEANER
Filed Nov. 26, 1942
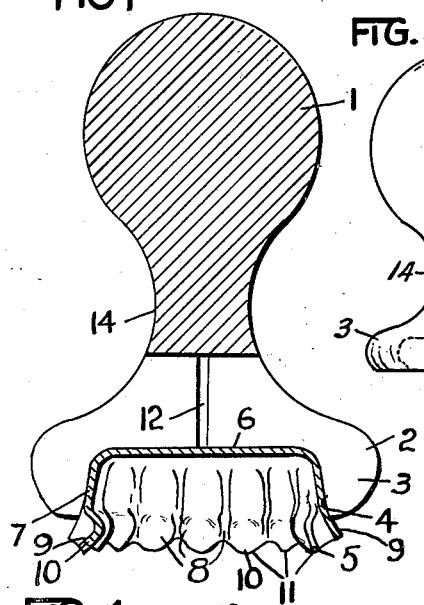
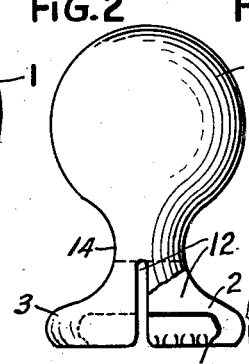
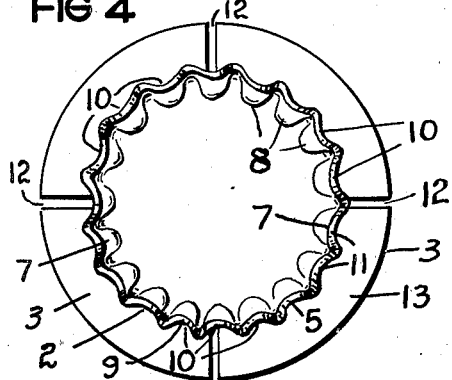
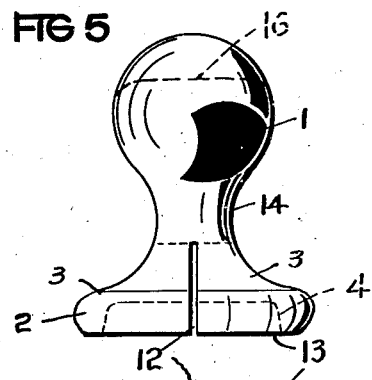
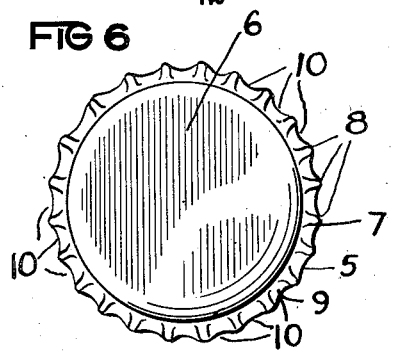
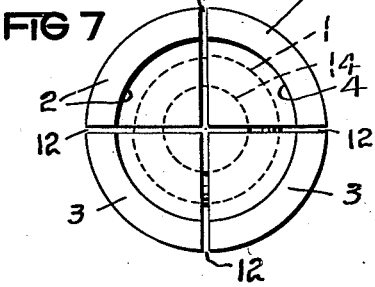
INVENTOR.
GUSTAF L. REENSTIERNA.
BY Paul A. Talbot
ATTORNEY.

Patented Mar. 12, 1946

2,396,388

UNITED STATES PATENT OFFICE 2,396,388

CAP CLEANER

Gustaf L. Reenstierna, Union City, N. J., assignor of one-half to John A. Morrone, Jersey City, N. J.

Application November 26, 1942, Serial No. 467,004

2 Claims. (Cl. 15—236)

My invention relates to a cleaner, particularly a device for scraping pots and pans having a handle yieldingly holding a crown cap or similar metal part having a scalloped scraping edge. Among the purposes and objects of my invention are to provide:

A cup shaped serrated scraper and handle for detachably holding the scraper.

A scraper for using used crown cap or similar scraping member.

A quick easy way of detachably holding crown caps.

A scraper having a plurality of cutting edges for cleaning frying pans, fish scales, etc.

A simple, effective cleaner and scraper.

I accomplish these and other objects by the construction hereinafter described and illustrated in the accompanying drawing forming a part hereof, in which:

Fig. 1 is a sectional elevation.

Fig. 2 is a view, partly in section, of a modification.

Fig. 3 is a perspective view showing one of the applications of my device.

Fig. 4 is a bottom view.

Fig. 5 is an elevation of the handle.

Fig. 6 is a plan view of the scraper.

Fig. 7 is a bottom view of the handle.

Similar reference characters refer to similar parts throughout the several views of the drawing and in the specification to follow.

The uneven or serrated edge of the common metal cap, very extensively used for a bottle stopper, has been found to be an excellent scraper and cleaner for many purposes, particularly useful in dislodging stubborn, baked on matter from frying pans and for many other uses such as removing the scales from many kinds of fish, dislodging paint and rust.

As the edge becomes dull or worn away, the insertion of a new crown cap is quickly and easily done without cost because such caps need only be saved instead of discarding as usual. The crown cap or a metal part having similar characteristics, forms a part of my device cooperating with the handle and holding part to perform the useful result for which it is so well adapted.

In this disclosure, I have not attempted to show and describe all of the numerous modifications which may suggest themselves to a person studying it and who is skilled in the art to which this invention pertains.

I wish it understood that detailed and precise description and the drawing to which this description refers, is to illustrate rather than to limit the scope of my invention which is set forth in the appended claims.

This disclosure is an embodiment of the principles underlying my invention.

Referring to the drawing, I have shown a handle 1 secured to or formed integral with the holder 2 comprising a plurality of yielding gripping members 3 which extend below the handle and combined, provide a socket 4 of a size to snugly yieldingly engage the exterior of the metal scraper 5.

The scraper 5 is in inverted cupped metal member comprising a disk 6 having a peripheral depending flange 7 corrugated 8 and flared outwardly 9, thereby providing a plurality of scraping inclined lips 10.

The lower edge 11 of the flange is generally scalloped, each lip of the lower edge is the lower or contact part of the scalloped edge and the whole scraper 5 is substantially the construction of the commonly used crown cap used in the closing of bottles for carbonated beverages and beer.

The socket 4 which receives the scraper 5 may be a recess in the bottom of the holder and handle and the inner diameter may be increased when forced over the exterior of the scraper by springing the gripping members which may be formed by a plurality of slits 12 extending upwardly from the lower edge 13 of the holder 2 to a neck 14 between the handle and holder.

The handle and holder may be of wood or other springy material and the slits may be sawed or milled.

In Fig. 2, I have shown a modification of the socket in which are provided a plurality of inwardly projecting knobs 15 which may engage the corrugations or the upper end of the corrugations in the flanges of the scraper 5.

In Fig. 5, I have shown in the broken line 16, a variation of the shape of the top of the handle 1 providing a flattened top as compared with the spherical top shown in full lines.

The size and shape of the handle may vary to suit the service for which my device is used.

What I claim as new and desire to secure by Letters Patent is set forth in the following claims.

I claim:

1. In an integral handle of wood or the like, for holding crown caps for use as scrapers, said integral handle being enlarged at one end, a neck reduced in area and a holder and socket connected to said enlarged handle end by said neck, said holder comprising a plurality of gripping members and a plurality of slits separating said gripping members and severing the periphery of said socket to provide resilient segments, said slits terminating near the minimum area of said neck to permit said socket to expand and grip said cap in said socket.

2. In an integral handle of wood or the like, for holding crown caps for use as scrapers, said integral handle being enlarged at one end, a neck reduced in area and a holder and socket connected to said enlarged handle end by said neck, said holder comprising a plurality of gripping members and a plurality of slits separating said gripping members and severing the periphery of said socket to provide resilient segments, said slits terminating near the minimum area of said neck to permit said socket to expand and grip said cap in said socket and inwardly projecting knobs in said socket to engage the peripheral corrugations of said cap.

GUSTAF L. REENSTIERNA.